Figure 1:
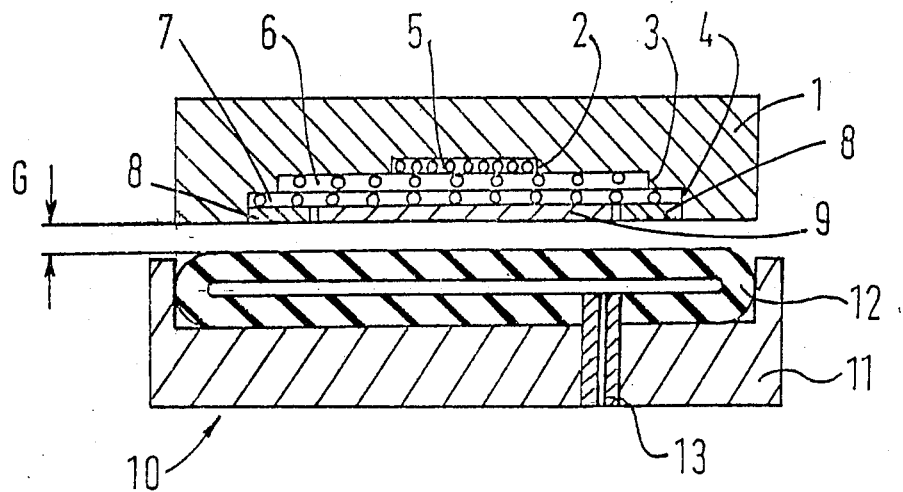

United States Patent [19]

Sumner

[11] Patent Number: 4,689,101
[45] Date of Patent: Aug. 25, 1987

[54] METHOD OF MAKING TIRE FABRIC IMPREGNATED WITH RUBBER

[75] Inventor: Anthony J. M. Sumner, Near Stratford-on-Avon, England

[73] Assignee: Apsley Metals Limited, United Kingdom

[21] Appl. No.: 625,817

[22] Filed: Jun. 28, 1984

[30] Foreign Application Priority Data

Jul. 5, 1983 [GB] United Kingdom ................ 8318119

[51] Int. Cl.$^4$ ............................................. B29B 15/10
[52] U.S. Cl. ................................ 156/110.1; 156/123; 264/320; 264/322
[58] Field of Search ..................... 156/110.1, 123, 124, 156/126, 127, 128.6, 129, 130, 130.3, 130.5, 416; 152/361 R, 361 FP, 361 DM; 264/320, 322

[56] References Cited

U.S. PATENT DOCUMENTS

| | | | |
|---|---|---|---|
| 1,426,672 | 8/1922 | Radford | 156/129 |
| 3,143,450 | 8/1964 | Barber et al. | 156/129 |
| 3,531,356 | 9/1970 | Henley | 156/416 |
| 3,935,045 | 1/1976 | Wolfe | 156/96 |

FOREIGN PATENT DOCUMENTS 55-50777 12/1980 Japan .
356157 10/1972 U.S.S.R. .

*Primary Examiner*—Michael Ball
*Attorney, Agent, or Firm*—Stevens, Davis, Miller & Mosher

[57] ABSTRACT

An apparatus and a method of manufacture for a tire component comprising a sheet of reinforced unvulcanized rubber compound having two parallel main surfaces comprising pre-coating the reinforcement material fabric of the component with unvulcanized rubber compound, placing the component in an open mould shaped to accommodate the component arranged to contact one of said surfaces, positioning a pressurizing member to contact the other said surface, maintaining the time/temperature conditions of the mould and the component below those required to cause vulcanization, operating the pressurizing member to apply substantial compressive force to the component so that the rubber compound is pressed into intimate contact with the reinforcement and removing the unvulcanized component from the mould. The method provides real penetration of the rubber compound into the reinforcement and is particularly valuable for tire breakers which are steel cord reinforced. The breakers may be made as annular rings or straight discrete lengths.

8 Claims, 2 Drawing Figures

METHOD OF MAKING TIRE FABRIC IMPREGNATED WITH RUBBER

This invention relates to tire manufacture and in particular to the moulding of tires and reinforced tire components which are reinforced by sheets of reinforced fabric.

Tires are reinforced by textile or metal reinforcement cords which are in the form of sheets of fabric coated with unvulcanized rubber which when cured provides the essential integrity between the cords of the fabric and other tire components such as, for example, the rubber tread. The coating of reinforcement cords with unvulcanized rubber is usually carried out by passing an assembled sheet of cords (i.e. the fabric) through the nip of a pair of calendar rolls together with rubber compound which is pressed or positioned between the reinforcement cords to form a handleable sheet. The pressures exerted on the rubber against the wires are low, of the order of 50 psi, and last for only a very short time through the nip and at the time of application of pressure the cords are held under tension through the rollers. The result is that the cords being tensioned are tightly wound and no real penetration of the rubber into the wires of each cord occurs. Considerable development effort has gone on, particularly in recent years, to solve this problem without success and the lack of good rubber penetration is well known to allow the spread of moisture and rust along the wires in the cords of steel breakers. Such calendaring processes are used for filler strip, carcass fabric and breaker fabric. Subsequently the completed tire is moulded in a tire press where high pressures, typically up to 400 psi for truck tires, are applied to the tire as it is heated to vulcanize the rubber components. The high pressures and the heat of the press produce interply and intercomponent bonds and also move entrapped air and moisture into very small volumes such that generally satisfactory tires result. Nevetheless failures do occur in service with component separation, e.g. tread separation and breaker separation and in any event the pressures required in tire presses and moulds makes them very expensive items of capital equipment.

One object of the present invention is to provide a method of manufacture for tire components including sheets of reinforcement fabric which gives improved rubber penetration into the reinforcement fabric prior to assembling the component to the tire.

According to one aspect of the present invention a method of manufacture for a sheet of reinforced unvulcanized rubber compound having two parallel main surfaces comprises precoating the reinforcement material fabric with unvulcanized rubber compound, placing the precoated fabric cord sheet in an open mould shaped to accommodate the precoated fabric cord sheet arranged to contact one of said surfaces, positioning a pressurizing member to contact the other said surface, maintaining the time/temperature conditions of the mould and the precoated fabric cord sheet below those required to cause vulcanization, operating the pressurizing member to apply substantial compressive force to the precoated fabric cord sheet so that the rubber compound is pressed into intimate contact with the reinforcement and removing the unvulcanized precoated fabric cord sheet from the mould.

Two or more precoated fabric cord sheet may be precoated and assembled together into the open mould so that the two or more precoated fabric cord sheet are compressed together.

The reinforced ply are preferably breaker plies for a tire made in discrete lengths having the length required for one full circumference of the tire.

Preferably the ply are each joined end-to-end to form annular ply and the open mould is annular so that the ply are pressurized in the required annular form for a tire.

In the above method the mould and precoated fabric cord sheet within the mould may be heated to assist rubber flow into the reinforcement but the temperature is in all cases kept below vulcanization temperatures, temperatures in the range 60°–80° C. are particularly effective.

According to another aspect of the invention an apparatus for the method of manufacture of a tire precoated fabric cord sheet comprises an elongate rigid mould defining an open mould cavity shaped to accommodate the reinforced precoated fabric cord sheet and contact one side thereof, a pressurizing member having means to position it to contact the other surface of the precoated fabric cord sheet and close the mould cavity, and means to control the mould temperature so that vulcanization does not occur in the mould.

Preferably the rigid mould is a ring and the open mould cavity is on the inner surface of the ring and the pressurizing member provides an annular pressurization surface. The pressurizing member is preferably a radially narrow section inflatable tubular bag which has a width in the axial direction greater than the width of the mould cavity.

It is most important that the precoated fabric cord sheet is unvulcanized so that it may be shaped during subsequent tire building and to provide good adhesion to other components.

Figure 2:
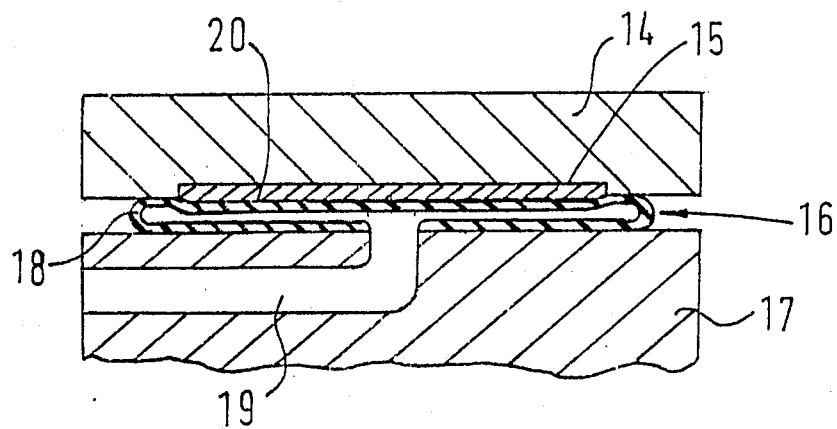

Further aspects of the present invention will be apparent from the following description, by way of example only, of two embodiments in conjunction with the attached diagrammatic drawing in which:

FIG. 1 is a radial cross-section of part of an annular tire breaker package mould, and FIG. 2 is a radial cross-section of part of an alternative annular tire breaker package mould.

The mould shown in FIG. 1 comprises an annular steel ring 1 which has machined into its radially inner surface a set of three grooves 2, 3 and 4. The grooves 2, 3 and 4 are dimensioned to fit the respective steel cord reinforced breaker plies 5, 6 and 7 for a truck tire. Groove 4 is made deeper than the thickness of the breaker ply 7 to include also a pair of stainless steel edge rings 8 and a central stainless steel compression transmitting ring 9. The compression ring 9 and edge rings 8 are cut so that they may expand radially by a small amount. The ring 1 includes electrical heating elements which are arranged to heat the mould to a temperature of about 80° C.

A pressurizing member assembly 10 is positioned inside the mould 1 and has an outer radius a small distance G less in radius than the mould 1 (note G is shown larger in the drawing for clarity than would be used in practice). The pressurizing member assembly 10 comprises an annular steel support ring 11 and a hollow rubber expander bag 12. An inflation valve 13 is also provided which is connected to a source of high pressure fluid (not shown).

The mould is used to compress together breaker plies precoated in rubber to give good penetration of the individual steel wires in each reinforcement cord and also to give good bonding between the breaker plies using the following steps. Firstly the pressurizing member assembly 10 is moved axially out of the mould 1 to allow access. The first breaker 5 is then prepared by assembling a sheet of reinforcement cords, coating both sides of the sheet with unvulcanized rubber topping compound and cutting the assembly at a bias angle to give the required cord angle in the breaker ply (usually of the order of 20°–30°) but may be other angles including 0° to the longitudinal centre line). The first breaker ply 5 is then laid into the groove 2 in the mould 1. The other two breakers 6 and 7 are prepared and fitted into the mould in the same way and finally the edge rings 8 and compression ring 9 are sprung into place as shown.

The pressurizing member assembly 10 is then moved axially into position within the mould 1 and hydraulic pressure is applied to the expander bag 12 to expand the stainless steel rings 8 and 9 and compress the breakers 5, 6 and 7 together. The high pressure 1000 psi (66 bar) and the heating of the mould which is typically to a temperature of 80° C. causes the rubber topping compound to penetrate the reinforcement cords and adhere to each wire. The treatment also provides improved breaker ply to breaker ply adhesion in a finished tire even though the tire has been cured at normal curing pressures. Thus it is no longer essential to use high pressures during final tire assembly vulcanization in order to achieve these benefits.

After treatment the breaker package is removed from the mould by axially moving the pressurizing member assembly 10 from the mould and radially collapsing the breaker which, being unvulcanized, is a fairly flexible ring.

While the mould has been described as an annular one-piece mould it should be appreciated that it may be a two-piece or a multi-segment mould which is assembled around the breaker package. This assists removal of the compressed breaker from the mould. Furthermore the mould and associated pressurizing member may be straight components rather than annular and used to form discrete lengths of impregnated material.

The mould shown in FIG. 2 is again an annular tire breaker mould but is intended for car tire breakers. More specifically it is for a 155SR12 radial car tire with a steel breaker which is a two-ply breaker. It comprises an annular steel ring 14 which has machined into its radially inner surface a single groove 15 which is 12 cms wide and 0.2 cms deep and the annulus has a diameter of 56 cms so that a breaker package of 56 cms diameter is made.

A pressurizing member 16 is mounted on a central steel support ring 17 and comprises a narrow section, expandable bladder 18 which has provided a fluid inlet port 19. The bladder 18 comprises a rubber bag reinforced by two plies of polyester tire cord fabric and has a width wider than the groove 15. The bag wall thickness is between 0.1 and 0.2 cms.

The upper surface 20 of the bag is covered with a non-stick material and the gap between the steel ring 14 and the support ring 17 is 1 cm so that the bladder 18 is in a narrow annular space as shown. Thus the fold radius of the bladder edges is about 0.5 cms and pressures up to 90 bar may therefore be safely used with a tire cord reinforced bladder 18.

The apparatus is operated in the same way as the first embodiment except that the intermediate force transmission components are omitted.

By high pressure is meant pressures greater than 500 psi (33 bar) and pressures in the range of 60–120 bar have been found particularly effective in producing penetration much better than hitherto.

It is most important to understand that the cords of the fabric are untensioned throughout the process which is quite different to known processes including calendaring and tire curing in a press and this gives great advantage as the rubber compound is therefore not prevented from entering the cord by the usual filament to filament contacts.

In a specific example, two 11 R 22.5 SP 111 tires were moulded using high pressure 375 psi hot water cure in a Bagomatic Press.

One contained a breaker band comprising 4 plies which were precompressed at 1000 psi at 80° C. for 30 minutes. The other tire was a normal production built tire where the breakers were assembled one at a time onto a shaped carcass.

Both sets of breakers were originally coated with rubber compound by cold calendering i.e. the normal production process.

After manufacture both tires were examined and ten wires were removed from the third breaker on each tire leaving the rubber coating intact. A rubber sleeve was moulded around each individual wire and a source of high pressure air (100 psi) was connected to one end of each wire in turn and the flow rate through the wire was measured by a flowmeter.

The results of these tests averaged out for the ten wires from each tire were as follows:
Precompressed breaker tire
(1000 psi) as per invention: 109 cc/min
Normal production Tire: 633 cc/min This clearly shows the great reduction in air flow which proves the much improved rubber penetration into the cord when treated according to the present invention.

Temperatures in the range of 60°–80° C. are also advantageous in producing the good penetration without vulcanization. The choice of temperature depends on the time the component is in the mould and the cord construction and may for some tire compounds be well in excess of 80° C.

Fitting steel reinforced compoents into the mould may be assisted by using magnets in the mould and it is also sometimes useful to use a non-stick coating on the mould to prevent sticking as the compound remains unvulcanized after impregnation.

Furthermore as in the second embodiment the stainless steel compression member is not always essential and when it is not used alternative anti-stick members such as polythene sheeting may be used to avoid sticking to the pressurizing bag.

The source of high pressure fluid may be pneumatic or hydraulic although the latter is preferred for safety reasons.

Finally while the process is particularly valuable for tire breaker material it is also effective for carcass and filler reinforcement material. The reinforcement material impregnated may be steel or textile.

What is claimed is:

1. A method of manufacture of only a reinforcing ply for a tire, said ply comprising a sheet of unvulcanized rubberized cord fabric having two parallel main surfaces, said method comprising the following steps:

precoating the cord fabric with layers of unvulcanized rubber topping compound, one layer against each main surface, placing the precoated fabric in an open cavity of a rigid mould, without tensioning of the cords thereof, with one main surface of the precoated fabric in contact with a wall of the cavity, the cavity being shaped overall to accommodate the precoated fabric, positioning a pressurizing member to contact the other main surface of the precoated fabric, maintaining the time and temperature conditions of the mould and pre-coated fabric below those required to cause vulcanization of the rubber compound, operating the pressurizing member to apply substantial compressive force to the other main surface of the pre-coated fabric to cause penetration of rubber compound into the reinforcement cords, and removing the unvulcanized rubberized ply so formed from the mould.

2. The method of claim 1 including cutting the unvulcanized rubber fabric sheet to the length required for a breaker ply prior to placing it in the mould.

3. The method of claim 1 including joining the ends of the precoated fabric sheet to form an annulus of a size to fit in an annular tire mould.

4. The method of claim 1 including positioning a compression transmitting member against the precoated fabric in the mould prior to placing the pressurizing member in the mould.

5. The method of claim 1 including applying a compressive force to the precoated fabric of greater than 33 bar.

6. The method of claim 1 including applying a compressive force in the range of 60-90 bar.

7. The method of claim 1 including heating the precoated fabric to a temperature in the range of 60°-80° C.

8. A method of manufacture of only a reinforcement for a tire, said reinforcement comprising at least two plies, each comprising a sheet of unvulcanized rubberized cord fabric having two parallel main surfaces, said method comprising the following steps precoating each cord fabric with layers of unvulcanized rubber topping compound, one layer against each main surface, assembling together the sheets of precoated cord fabric into an open cavity of a rigid mould without tensioning the cords thereof, with one main surface of one sheet of precoated fabric in contact with a wall of the cavity, the cavity being shaped overall to accommodate the precoated fabric sheets, positioning a pressurizing member to contact with a main surface of the other sheet of precoated fabric, maintaining the time and temperature conditions of the mould and precoated fabric below those required to cause vulcanization of the rubber compound, operating the pressurizing member to apply substantial compressive force to the main surface of said other sheet of precoated fabric to compress the sheets of cord fabric together and to cause penetration of rubber compound into the reinforcement cord of the fabric, thus bonding the sheets together, and removing the unvulcanized rubberized ply so formed from the mould.

* * * * *